(12) United States Patent
Horcher et al.

(10) Patent No.: US 10,822,131 B2
(45) Date of Patent: Nov. 3, 2020

(54) SYSTEM FOR PRINTING, FOLDING, AND INSERTING PACK SLIPS

(71) Applicant: StreamTech Engineering, LLC, St. Louis, MO (US)

(72) Inventors: Steven A. Horcher, Carollton, TX (US); Alan R. Miller, Jr., St. Louis, MO (US)

(73) Assignee: StreamTech Engineering, LLC, St. Louis, MO (US)

( * ) Notice: Subject to any disclaimer, the term of this patent is extended or adjusted under 35 U.S.C. 154(b) by 146 days.

(21) Appl. No.: 16/156,439

(22) Filed: Oct. 10, 2018

(65) Prior Publication Data

US 2019/0109950 A1   Apr. 11, 2019

Related U.S. Application Data

(60) Provisional application No. 62/570,181, filed on Oct. 10, 2017.

(51) Int. Cl.
*B65B 61/20* (2006.01)
*B65B 67/02* (2006.01)
(Continued)

(52) U.S. Cl.
CPC .............. *B65B 61/20* (2013.01); *B65B 5/08* (2013.01); *B65B 5/10* (2013.01); *B65B 35/10* (2013.01); *B65B 65/00* (2013.01); *B65B 67/02* (2013.01); *B65G 43/00* (2013.01); *G05B 19/416* (2013.01); *H04N 1/0032* (2013.01); *H04N 1/00328* (2013.01); *B65G 2201/025* (2013.01); *B65G 2203/0283* (2013.01); *G05B 2219/45054* (2013.01)

(58) Field of Classification Search
CPC ................................. B65B 67/02; B65B 61/20
See application file for complete search history.

(56) References Cited

U.S. PATENT DOCUMENTS 5,323,587 A * 6/1994 Amaranti ................ B65B 35/52
53/155
5,414,974 A * 5/1995 Van de Ven ............ B07C 3/087
53/168
(Continued)

*Primary Examiner* — Thomas Randazzo
(74) *Attorney, Agent, or Firm* — Stinson LLP

(57) ABSTRACT

A system and method therefor for use with a conveyor carrying cartons inbound to a printing area and outbound away from the printing area. The system has a printer located in the printing area for printing documents to be inserted into corresponding cartons on the conveyor and a controller for cooperatively controlling operations of the conveyor and the printer based on the positions of the cartons relative to the printer. The controller includes a staging processor for determining when to cause the conveyor to carry the cartons inbound past the printer and when to cause the printer to print the documents. In operation, the controller queues the documents for printing, monitors outbound capacity of the conveyor based on detected positions of the cartons, releases a group of the cartons inbound on the conveyor in response to the outbound capacity reaching a predetermined threshold, and initiates printing the queued documents corresponding to the cartons in the group when the group of the cartons is released.

18 Claims, 12 Drawing Sheets

(51) Int. Cl.
*B65G 43/00* (2006.01)
*H04N 1/00* (2006.01)
*G05B 19/416* (2006.01)
*B65B 65/00* (2006.01)
*B65B 5/08* (2006.01)
*B65B 35/10* (2006.01)
*B65B 5/10* (2006.01)

(56) References Cited

U.S. PATENT DOCUMENTS

| | | | |
|---|---|---|---|
| 6,769,228 B1 * | 8/2004 | Mahar | B65B 61/20 |
| | | | 53/155 |
| 2007/0121158 A1 | 5/2007 | Panunto et al. | |
| 2008/0121537 A1 * | 5/2008 | Sankaran | B65B 57/00 |
| | | | 206/223 |
| 2011/0288678 A1 * | 11/2011 | Winkler | B65H 31/3018 |
| | | | 700/216 |
| 2012/0073241 A1 * | 3/2012 | Mahar | G01G 19/4148 |
| | | | 53/55 |
| 2012/0153562 A1 | 6/2012 | Morgott et al. | |
| 2014/0116013 A1 * | 5/2014 | Doke | B65B 5/067 |
| | | | 53/473 |
| 2017/0369195 A1 * | 12/2017 | Orillo | B65B 5/06 |

* cited by examiner

FIG. 7C
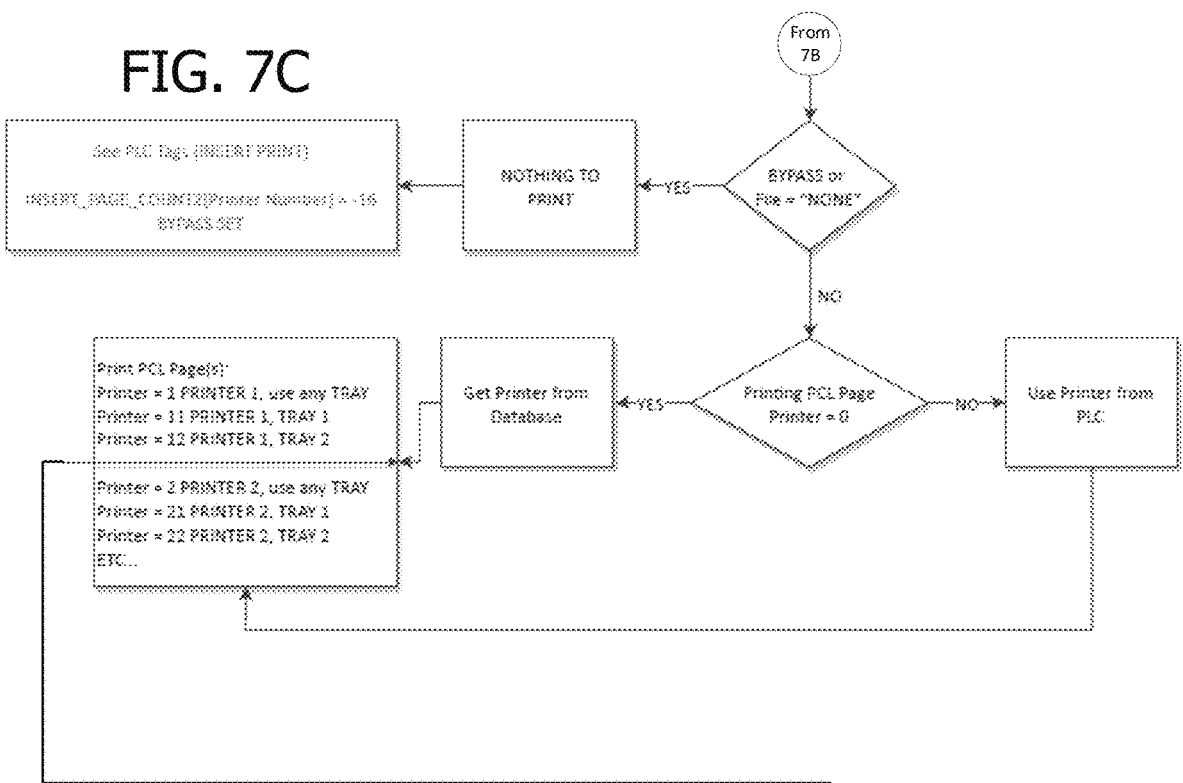
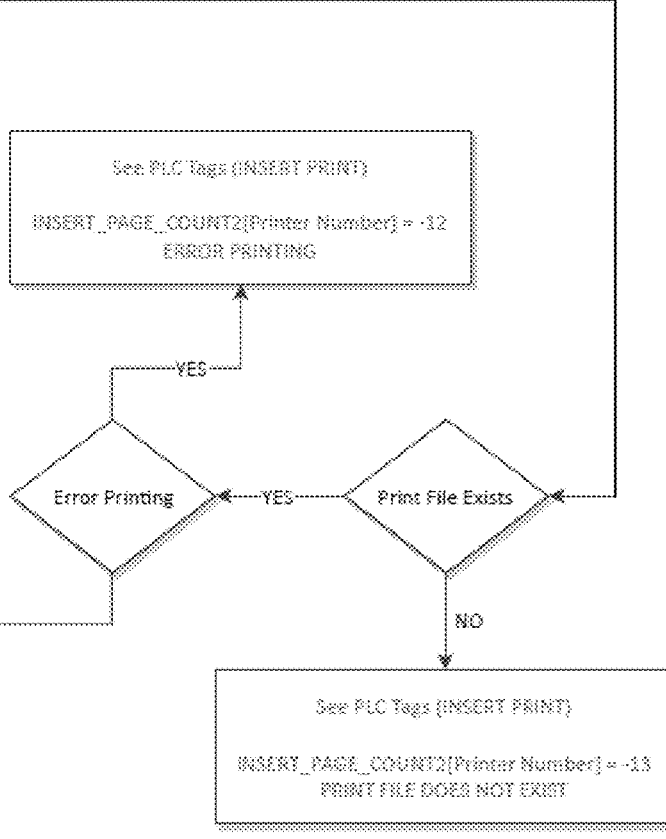

SYSTEM FOR PRINTING, FOLDING, AND INSERTING PACK SLIPS

CROSS REFERENCE TO RELATED APPLICATIONS

This application claims priority to U.S. Provisional Application No. 62/570,181, filed Oct. 10, 2017, the content of which is incorporated herein by reference in its entirety.

BACKGROUND

The need is for a device designed to automatically print, fold, and insert collateral such as pack slips into cases. Industry competitors have developed designs using inkjet and double-sided thermal pack slips. However, most customers prefer the low cost and quality of laser printed material. The problem with laser printers is the long spool up time ("first page"), which makes them ill-suited for conveyor-based printing, folding, and inserting systems.

From a cold start, laser printers have a long warm up period. This warm up period is in the range of 30 seconds. Since this condition exists typically at the start of the work day, or after an extended break, it is not considered when describing the sustained throughput of the process. A "first page" delay, also referred to as "time to first page" or "first page time", occurs when the laser printer has a warm start, where an intermediate sleep timer begins a series of shutdowns within the laser printer. A typical first page times is about 5 seconds Conventional print systems have relied on adjusting laser printer settings to reduce the "first page" times that reduce the frequency of printed documents. Another conventional approach involves multiple printers being serviced by a robot, with a buffer created holding the printed pages in trays. In both instances, the overall throughput of conventional approaches has been too slow. It is also likely that adjusting the "as shipped" or "factory standard" mode of operation of the laser printer may increase wear and required maintenance on the laser printer. Data is being gathered to determine the extent to which this affects the overall cost of ownership, and ultimately the value of avoiding these adjustments has for a customer.

SUMMARY

Aspects of the invention relate to a process to print plain paper documents on a laser printer, and automatically insert these documents into packages traveling on a conveyor in a simpler, lower cost, and faster manner.

A system embodying aspects of the invention is for use with a conveyor carrying cartons inbound to a printing area and outbound away from the printing area. The system has a printer located in the printing area for printing documents to be inserted into corresponding cartons on the conveyor and a controller for cooperatively controlling operations of the conveyor and the printer based on the positions of the cartons relative to the printer. The controller includes a staging processor for determining when to cause the conveyor to carry the cartons inbound past the printer and when to cause the printer to print the documents. In operation, the controller queues the documents for printing, monitors outbound capacity of the conveyor based on detected positions of the cartons, releases a group of the cartons inbound on the conveyor in response to the outbound capacity reaching a predetermined threshold, and initiates printing the queued documents corresponding to the cartons in the group when the group of the cartons is released.

A computer-implemented method embodying aspects of the invention determines when to cause the conveyor to carry the cartons inbound past the printer and when to cause the printer to print the documents. The method includes queuing the documents for printing, monitoring outbound capacity of the conveyor based on detected positions of the cartons, releasing a group of the cartons inbound on the conveyor in response to the outbound capacity reaching a predetermined threshold, and initiating printing the queued documents corresponding to the cartons in the group when the group of the cartons is released.

A computer-readable storage device embodying aspects of the invention comprises instructions that, when executed by a processor, perform a method that includes queuing the documents for printing, monitoring outbound capacity of the conveyor based on detected positions of the cartons, releasing a group of the cartons inbound on the conveyor in response to the outbound capacity reaching a predetermined threshold, and initiating printing the queued documents corresponding to the cartons in the group when the group of the cartons is released.

Other objects and features will be in part apparent and in part pointed out hereinafter.

BRIEF DESCRIPTION OF THE DRAWINGS

FIG. 7C is an exemplary process flow diagram depicting a third part of a printing and verification process according to an embodiment.

Corresponding reference characters indicate corresponding parts throughout the drawings.

DETAILED DESCRIPTION

Figure 1:
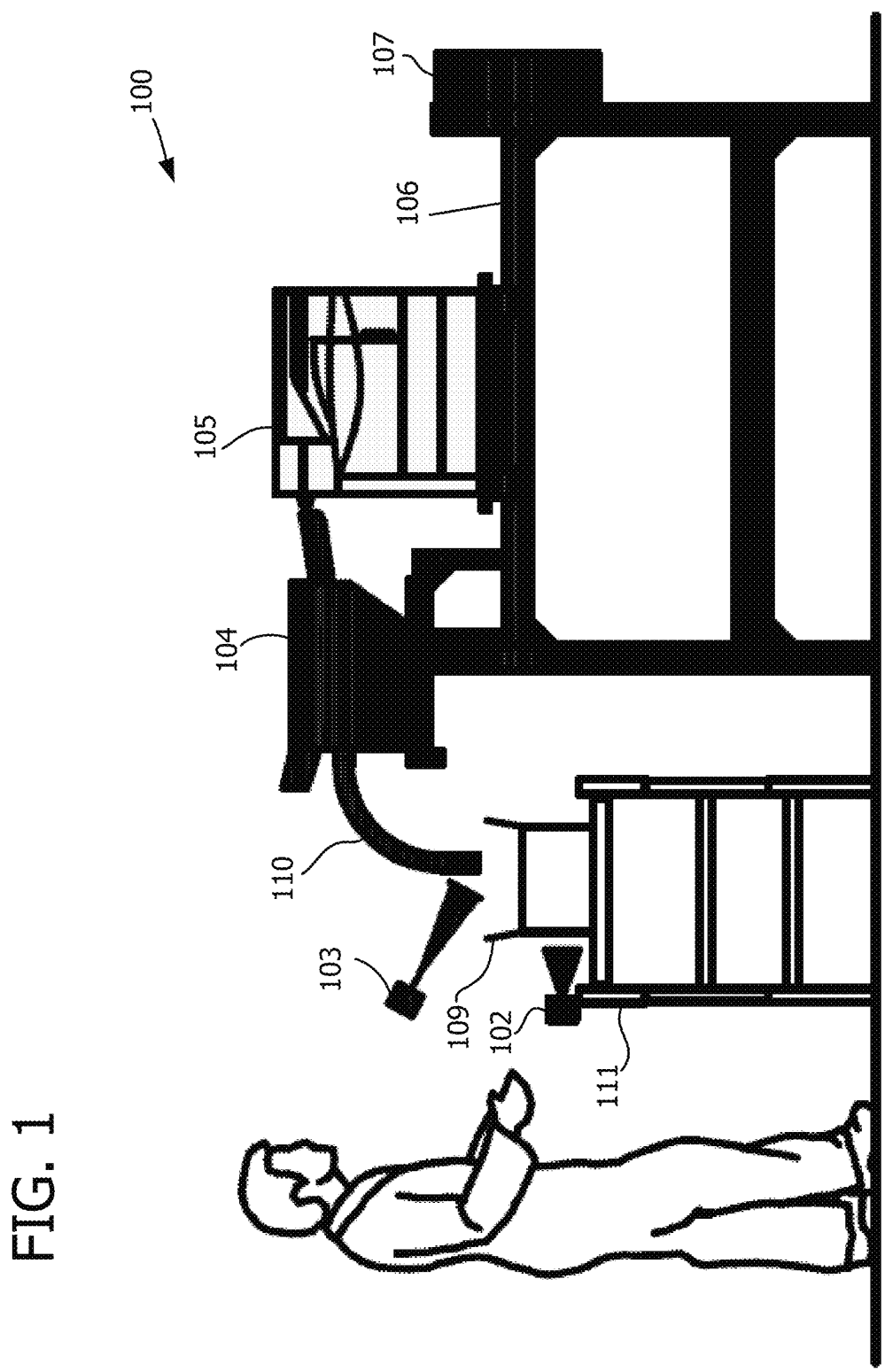
FIG. 1 is a side view of a printing, folding, and inserting system according to an embodiment.

Referring to FIG. 1, a printing, folding, and inserting system 100 embodying aspects of the present disclosure provides an automated process to print plain paper documents on a laser printer 105, and insert these documents into open cartons, totes or trays. As used herein, "carton" includes any open carton, tote, tray, or other package type. Advantageously, the system 100 is faster than comparable competitors' processes without the need to use multiple printers, robots, or complex paper buffering systems to achieve desired throughput. In operation, system 100 reduces the frequency of the "first page" of a laser printer by staging the work (i.e., cartons awaiting documents) in a manner that allows multiple documents to appear to the laser printer 105 in rapid succession. As described above, a typical first page times is about 5 seconds. By contrast, a typical time to print a page without a first page delay averages about 1.7 seconds. This quick transmission of documents allows the laser printer 105 to print in a continuous manner rather than starting and stopping, which allows the realized throughput of system 100 to outperform similar systems built by other companies. Further, system 100 can be configured to allow slower processing when the downstream demand is modest. The accommodation of the slower demand is included eliminate idle time in the process.

Figure 2:
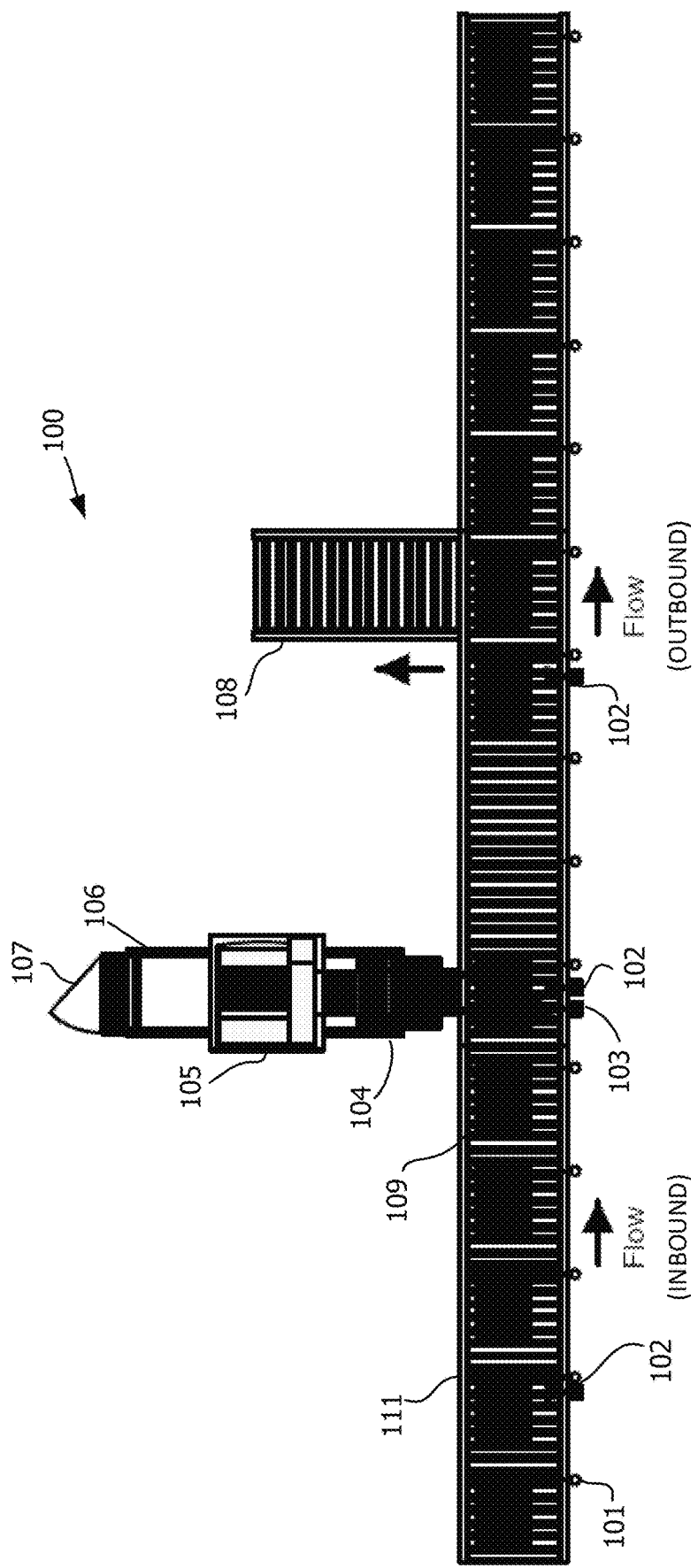
FIG. 2 is a top view of the printing, folding, and inserting system of FIG. 1 indicating direction of flow and inbound and outbound zones

FIG. 2 is a top view of the printing, folding, and inserting system of FIG. 1 indicating direction of flow and inbound and outbound zones. To accomplish this process reliably, system 100 continuously monitors the outbound capacity of a conveyor 111 carrying a group or "train" of cartons or packages 109. The available capacity of the outbound conveyor 111 is used to throttle the number of cartons 109, and corresponding documents that are queued to laser printer 105. So long as the takeaway process continuously removes cartons 109, the "first page" wait time of the laser printer 105 is absorbed by the first package processed. This efficiency continues until a gap in the inbound cartons 109, or a delay from the takeaway is long enough to cause the internal time limits of laser printer 105 to reach the point where a "first page" delay is introduced.

In operation according to an embodiment, the unique design of system 100 involves sophisticated controls releasing a group or "train" of cartons 109 along conveyor 111 as well as a group of pack slips at the same time. The system 100 prints the pack slips at printer 105 and folds them at a document folder 104. A document scanner 103 scans the pack slips and a package scanner 102 scans the respective carton 109 to perform a parity check to ensure that they match. This takes advantage of the fast "second page". More than one pack slip can be printed for a single carton 109. A controller 108 executes computer-readable instructions to synchronize the passage of the cartons 109 to align with the pack slips as they are produced. Software configurable business rules allow some non-barcoded pages to be inserted without scanning so long as one page per carton is scanned.

In an embodiment, one or more sensors 101 detect the presence of each carton 109 as it travels along conveyor 111 as shown in FIG. 2

Figure 3:
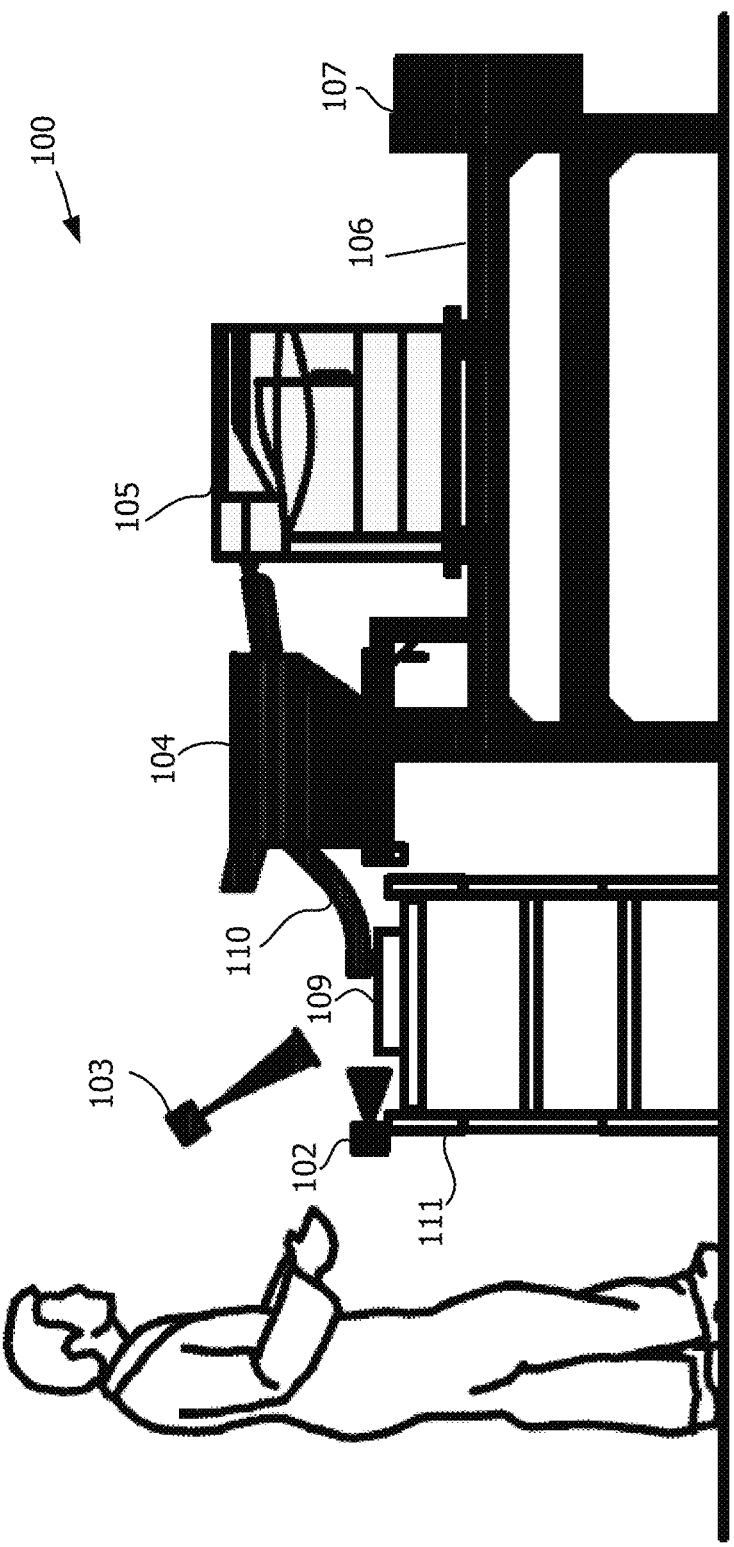
FIG. 3 is another side view of a printing folding and inserting system according to an embodiment.

FIG. 3 is a side view of printing, folding, and inserting system 100 according to an alternative embodiment. As shown, system 100 includes a horizontal chute and has fixed height trays. By comparison, system 100 as shown in FIG. 1 employs a vertical chute to accommodate variable-height cartons/totes.

Figure 4:
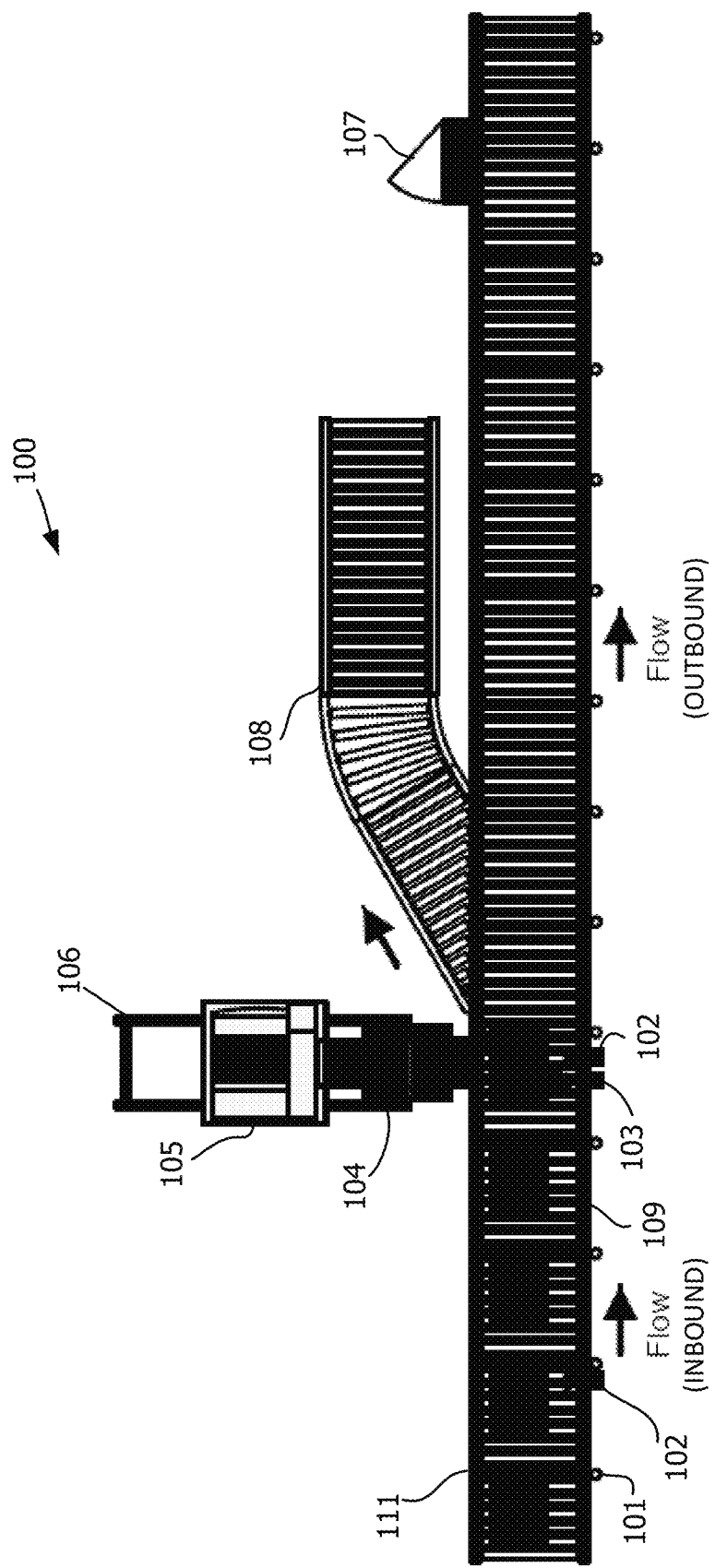
FIG. 4 is another top view of a printing, folding, and inserting system according to an alternative embodiment.

In embodiments, the controller 107 can be positioned locally to the printer, for example on a stand 106 as shown in FIG. 2. Alternatively, the controller 107 can be positioned remotely from the printer 105 as shown in FIG. 4. When controller 107 is positioned locally to the printer 105 it can be connected to the printer using a landline (wired connection). When controller 107 is positioned remotely to the printer 105 it can be connected to the printer using a wireless connection.

In operation according to an embodiment, the unique design of system 100 allows for identifying mislabeled or misprinted cartons. Mislabeled or misprinted cartons can comprise cartons wherein an identifying indicia on the carton (e.g., an LPN, or "license plate number") does not match parallel identifying indicia printed on a document (e.g., a tracking number printed on a packing slip) inserted in the carton 109. In addition, mislabeled or misprinted cartons can comprise cartons having an inaccurate identifying indicia printed on the carton as compared to a list of stored identifying indicia (e.g., tracking numbers) on a database.

Therefore, in an embodiment, system 100 allows for diverting cartons 109 that were mislabeled with identifying indicia not found in the list of stored identifying indicia in the database. The controller in an embodiment comprises an exception driver configured to compare identifying indicia on cartons 109 with corresponding identifying indicia stored in a database to determine which cartons have indicia that does not match the corresponding identifying indicia stored in the database. When controller 107 detects mislabeled cartons 109, the exception driver generates a divert command in response. The divert command triggers the opening of a gate that diverts cartons 109 off of the main takeaway, or primary lane, of conveyor 111 and onto an exception lane 108.

Identifying indicia as used herein can comprise any identifying information printed on the carton or document for insertion therein. For example, identifying indicia can include LPN numbers, tracking numbers, optical machine-readable representations of data, such as bar codes, UPC codes, QR codes, and the like. While the system 100 allows for unidentified documents to be printed, every set of documents delivered to each carton 109 must have at least one document having identifying indicia printed thereon.

In embodiments, the exception lane 108 may be positioned at any angle relative to the direction of the main conveyor 111. In some embodiments the exception lane 108 is positioned perpendicularly to the conveyor 111 as shown in FIG. 2. In other embodiments, the exception lane 108 is positioned at a 30 degree angle to the conveyor 111 as shown in FIG. 4.

Figure 5:
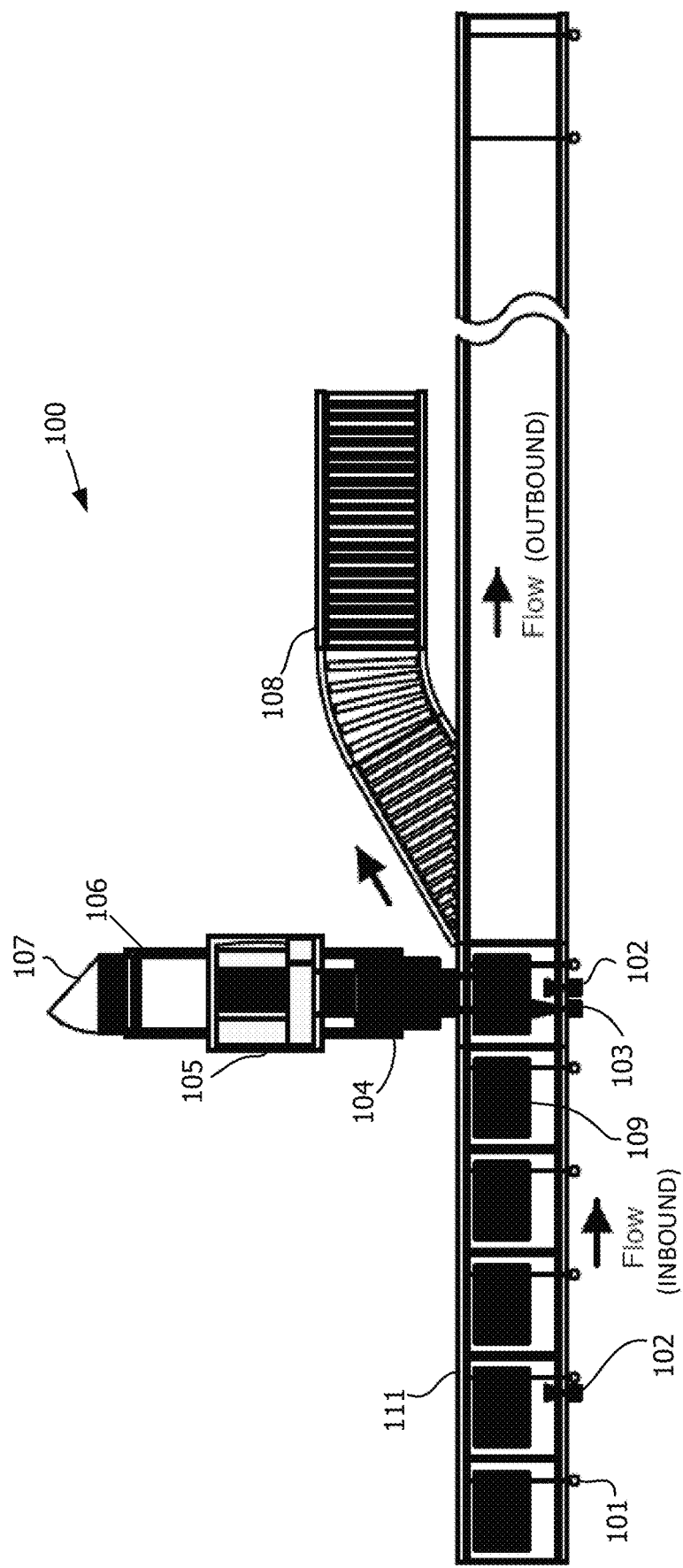
FIG. 5 is another top view of a printing, folding, and inserting system according to an alternative embodiment.

In embodiments wherein the identifying indicia on the carton 109 and the indicia in the database (e.g., packing slip) do match, the carton proceeds onto a conveyor takeaway. In an embodiment the conveyor takeaway can be a roller conveyor takeaway as depicted in FIGS. 2 and 4. In other embodiments, the conveyor takeaway can be a belt takeaway as depicted in FIG. 5.

According to an embodiment of the disclosure, system 100 operates according to the following Sequence of Events:

The controller 107 executes Streamtech (STE) System Software to establish and maintain a connection to a Customer's Host software.

Prior to cartons 109 arriving at system 100 (also referred to as "the FoldSerter"), the Host system sends a Message and Document Files to the Streamtech Software for each of the packages.

The STE Software inserts the data from the Messages into the STE Database on a System PC, and processes the Document Files, making them available to the FoldSerter Process upon demand. In an embodiment, processing the Document Files comprises converting the Files into a .PCL format. The number of .PCL pages are then counted and the resulting page count stored as a database record. In an embodiment, the System PC is a separate computing device while in another embodiment the System PC is embodied by controller 107.

The cartons 109 are identified at the INDUCT conveyor zone. The FoldSerter controller 107 evaluates the downstream capacity of the system 100, and communicates with the Streamtech Software when desirable conditions are met, triggering the Streamtech Software to send Documents for the cartons 109 to the laser printer 105.

Carton data is tracked with cartons 109 as they are indexed through the conveyor zones to the FoldSerter. The cartons 109 are identified once more at the FoldSerter, and each document is counted and identified as it enters each carton. The FoldSerter controller 107 communicates with the Streamtech software to perform a check to VERIFY each document. The VERIFY results are added to the STE Database.

The Streamtech software allows a customer to either require every document to have an identity, or allow the customer to include documents without an identity (Country of Origin, Material Safety Data Sheets, for example). In either case, the set of documents delivered to each package must have at least one document that is identified to allow the VERIFY process.

The conveyor 111 conveys cartons 109 away from the FoldSerter toward an Exception Divert (as shown in FIGS. 2 and 3) where the packages are identified. The FoldSerter controller 107 communicates with the Streamtech Software, and cartons 109 are either allowed to continue to a take-away process or are diverted to an Exception area (e.g., exception lane 108) for manual inspection based upon the VERIFY results stored in the Streamtech Database.

The following is an example of efficiency metrics of system 10 operating in accordance with embodiments of the invention.

Example: Throughput Efficiencies (Single Page Document Per Carton)
  Print each document as a first page. 5 seconds per document. 60/5=12 per minute.
  Print each document as a first page. Competitor makes changes to achieve 4.2 seconds per document. 60/4.2=14.3 per minute
  FoldSerter process. 5 seconds for first document, 1.7 seconds for subsequent documents.
    Groups of 3 cartons have been practical when integrating with take-away processes.
    Group of 3. 5+1.7+1.7=8.4 sec, 8.4/3=2.8 sec/document. 60/2.8=21.4 per minute.
    Material handling practices throttle the carton flow slightly. Systems processing groups of three have a net throughput of 19.5 per minute, ~9% of the calculated throughput consumed by ramp up/down conveyor times primarily.

The FoldSerter process also excels when cartons 109 require multiple pages. The same calculation can be applied.

To accomplish this process reliably, the outbound conveyor capacity is continuously monitored. The available capacity of the outbound zone of conveyor 111 is used to throttle the number of cartons 109, and corresponding documents that are queued to the printer 105. As the outbound zone of conveyor 111 becomes clear, or is in the process of clearing, the number of cartons 109 that the conveyor 111 can accept is determined—which is the number of inbound cartons 109 that are released into the FoldSerter process area.

So long as the takeaway process continuously removes cartons 109, the laser printer "first page" wait time is absorbed by the first carton processed. This efficiency continues until a gap in the inbound cartons 109, or a delay from the takeaway is long enough to cause the laser printer internal time limits to reach the point where a "first page" delay is introduced.

FIGS. 6, 7A-7E, and 8 illustrate an exemplary process flow diagram according to an embodiment. The StreamTech software allows a customer to either require every document to have an identity, or allow the customer to include documents without an identity (Country of Origin, Material Safety Data Sheets, for example). In either case, the set of documents delivered to each carton 109 must have at least one document that is identified to allow the VERIFY process. Cartons 109 are conveyed away from the FoldSerter toward an Exception Divert where the cartons are identified. The FoldSerter controller 107 communicates with the StreamTech software, and cartons 109 are either allowed to continue to a take-away process or are diverted to an Exception area based upon the VERIFY results stored in the StreamTech database.

In addition to the embodiments described above, embodiments of the present disclosure may comprise a computer implemented method for use with a conveyor configured to carry a plurality of cartons inbound to a printing area and outbound away from the printing area, said conveyor having an outbound capacity as a function of a number of cartons carried thereon away from the printing area.

The computer implemented method in an embodiment comprises queuing documents for printing on printer 105 located in the printing area. The printer 105 is configured to print one or more documents to be inserted into corresponding cartons 109 on the conveyor 111. In addition, printer 105 is capable of printing a first page in a first period of time and printing a second page after the first page in a second period of time that is less than the first period.

According to an embodiment, the computer implemented method further comprises detecting a position of at least one of the cartons 109 on the conveyor 111, monitoring an outbound capacity of the conveyor 111 based on the detected position of the at least one of the cartons 109, releasing a group of the cartons 109 inbound on the conveyor 111 in response to the outbound capacity reaching a predetermined threshold, and initiating printing the queued documents corresponding to the cartons 109 in the group when the group of cartons 109 is released.

The computer implemented method can further comprise detecting identifying indicia on the cartons 109 and verifying each of the cartons 109 match the corresponding document inserted therein based on the detected identifying indicia. The method verifies that the identifying indicia on the cartons matches corresponding identifying indicia stored in a database by querying a scanned LPN and tracking number in a database. In embodiments, verifying comprises setting a verify tag if the scanned LPN matches the tracking number in the database. In embodiments, the method comprise directing the cartons 109 for which the verify tag is set onto the conveyor 111 to carry the cartons 109 away. In other embodiments, if the scanned LPN does not match the tracking number in the database the method sets a reject tag. In further embodiments, the method further comprises activating a gate on the conveyor 111 for diverting the cartons 109 for which the reject tag is set.

An exemplary embodiment for the computer implemented method described herein is depicted in FIGS. 6, 7A-7E, and 8 and further described herein.

Figure 6:
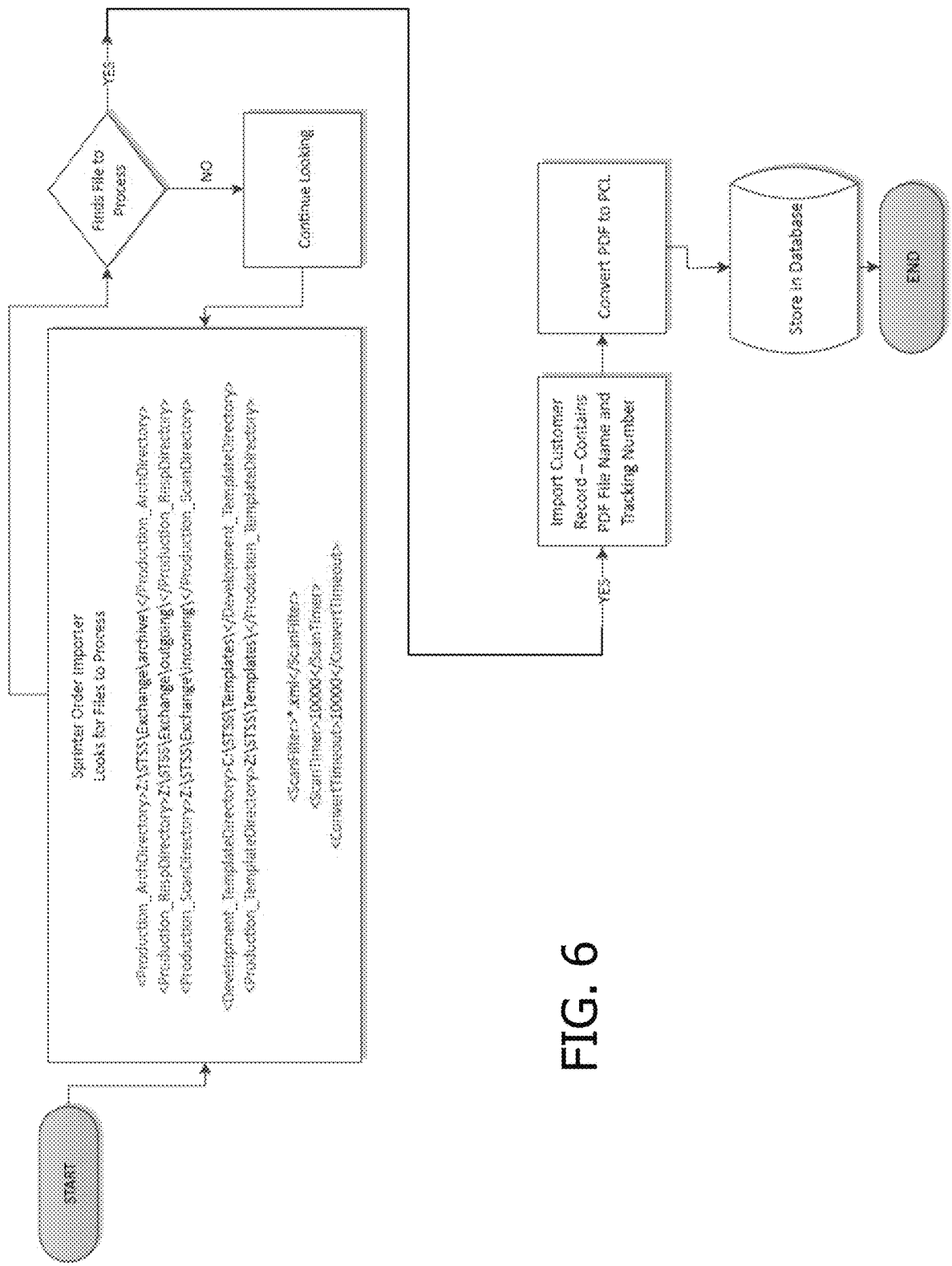
FIG. 6 is an exemplary process flow diagram depicting a file conversion process according to an embodiment.

In an embodiment, the computer implemented method processes Document Files and converts them to .PCL format. This method is depicted in FIG. 6. The conversion initiates when a Sprinter Order Importer looks for files to process. If any files are identified, a customer record containing the PDF file name and tracking number is generated as a PDF and converted to .PCL to store in a database. FIGS. 7A-7E illustrate a flow chart showing computer implemented processes resulting in the printing of cartons 109 and documents and the verifying of said cartons 109 and documents as outlined in the following steps.

Figure 7A:
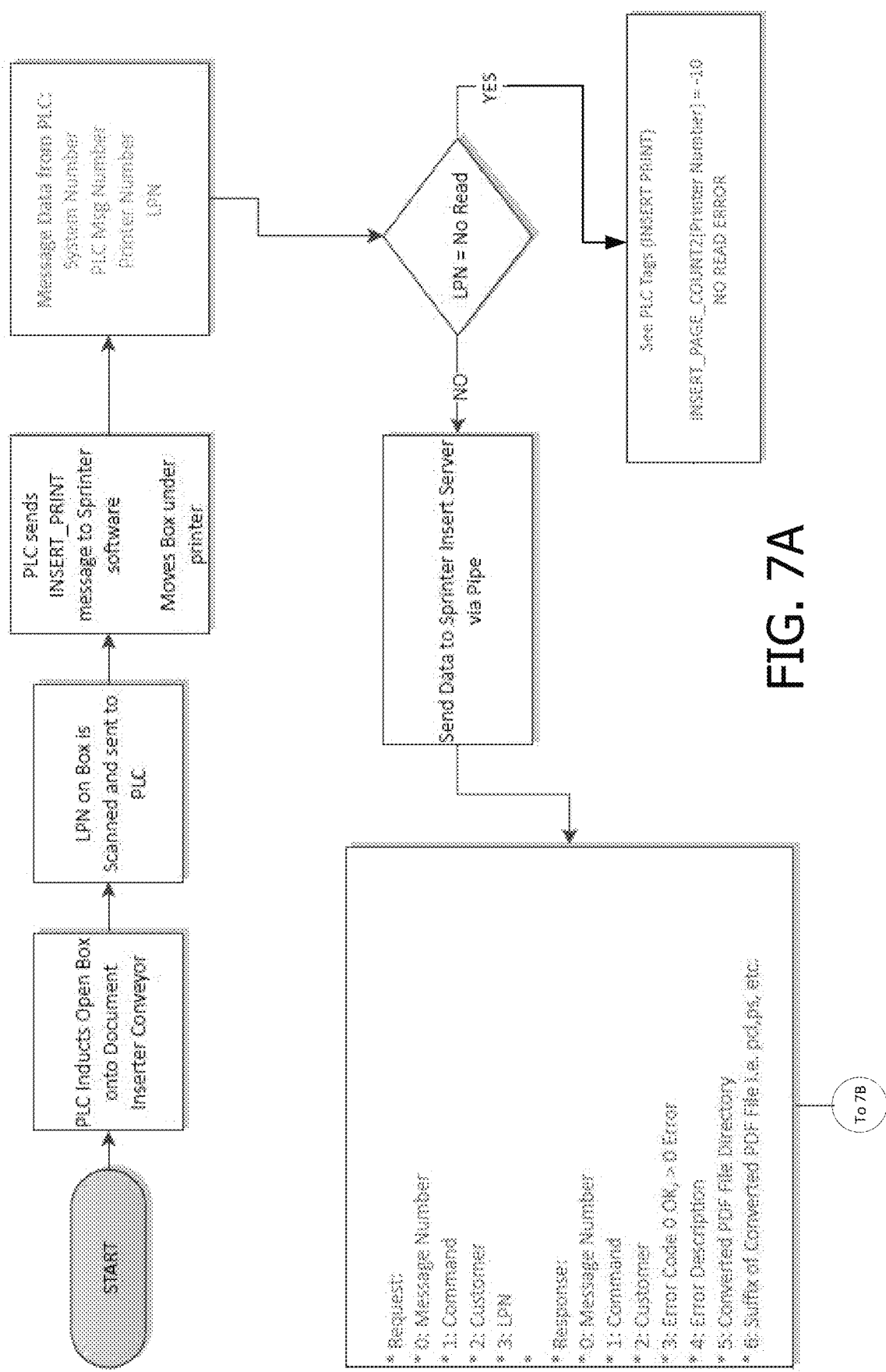
FIG. 7A is an exemplary process flow diagram depicting the first part of a printing and verification process according to an embodiment.

In FIG. 7A, the PLC inducts open box onto document inserter conveyor (Step 1). The LPN on the box is scanned and sent to the PLC (Step 2), which then sends an INSERT_PRINT message to Sprinter software which moves the box under printer.

As used herein, an INSERT_PRINT message comprises the following:

PC_INSERT_PRINT MSG_NO(Printer Number)=
PLC Msg Number.

PC_INSERT_PRINTER_ASSIGNMENT(Printer Number)=Printer number

PC_INSERT_PRINT_FAILED(Printer Number)=0 (GOOD),1(FAILED).

The following Message Data from the PLC is collected: system number, PLC msg number, printer number and the LPN. A query is initiated to check whether LPN cannot be read (LPN=No Read). If yes, a NO READ ERROR is generated; if no, the data is send to Sprinter Insert Server via Pipe. The Sprinter Insert Server generates a response containing the message number, the command, the customer, an error code (0, OK or >0, Error), the Error description (if applicable), the converted PDF file directory and a suffix of the converted PDF File (i.e pcl, ps, etc).

Figure 7B:
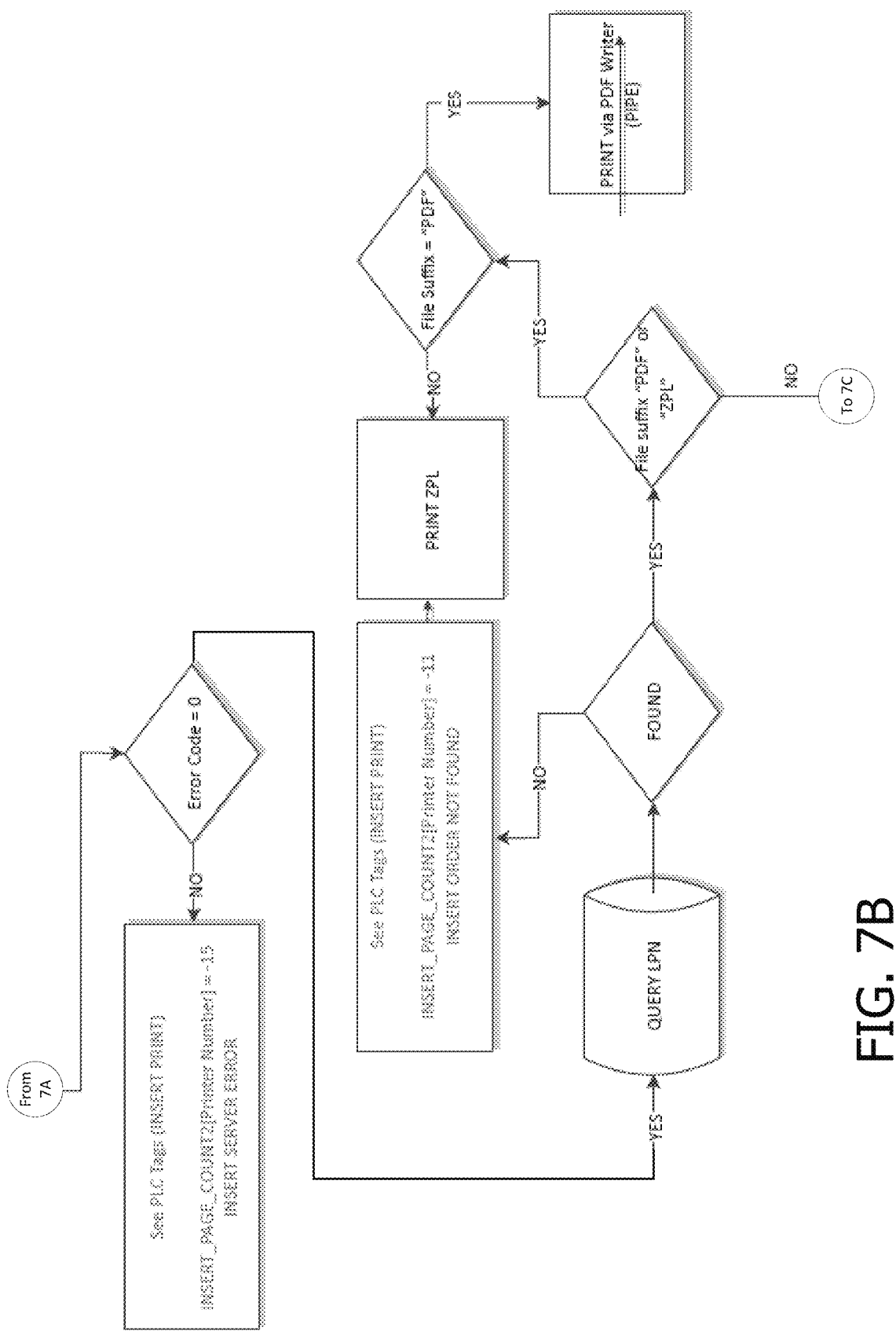
FIG. 7B is an exemplary process flow diagram depicting a second part of a printing and verification process according to an embodiment.

Referring to FIG. 7B, from the response generated by the Springer Insert Server in FIG. 7A, a query is initiated to confirm whether the Error code=0. If no, an INSERT SERVER ERROR is generated. If yes, a query is initiated to search the LPN value in the database generated from the process described in FIG. 6. If not found, an INSERT ORDER NOT FOUND error is generated. If found, a query is initiated to see if the file suffix is "PDF" or "ZPL". If yes, and the file suffix is "PDF" the file is sent to a PRINT via PDF Writer pipeline. If yes, and the file suffix is "ZPL", the file is sent to PRINT ZPL. If the file suffix is not "PDF" or "ZPL" then the file continues to FIG. 7C.

In FIG. 7C, from the response generated in FIG. 7B, a query is generated to BYPASS or File "NONE". If yes, nothing to print and a BYPASS SET command is generated. If no, a query is generated to print the PCL page if Printer=0. If yes, the printer is taken from the database. If no, the Printer from the PLC is used. The printing is initiated; a print file exists query is initiated. If no, the PRINT FILE DOES NOT EXIST error is generated. If yes, an error printing query is generated. If yes, an ERROR PRINTING error is generated. If no, the process continues to FIG. 7D.

Figure 7D:
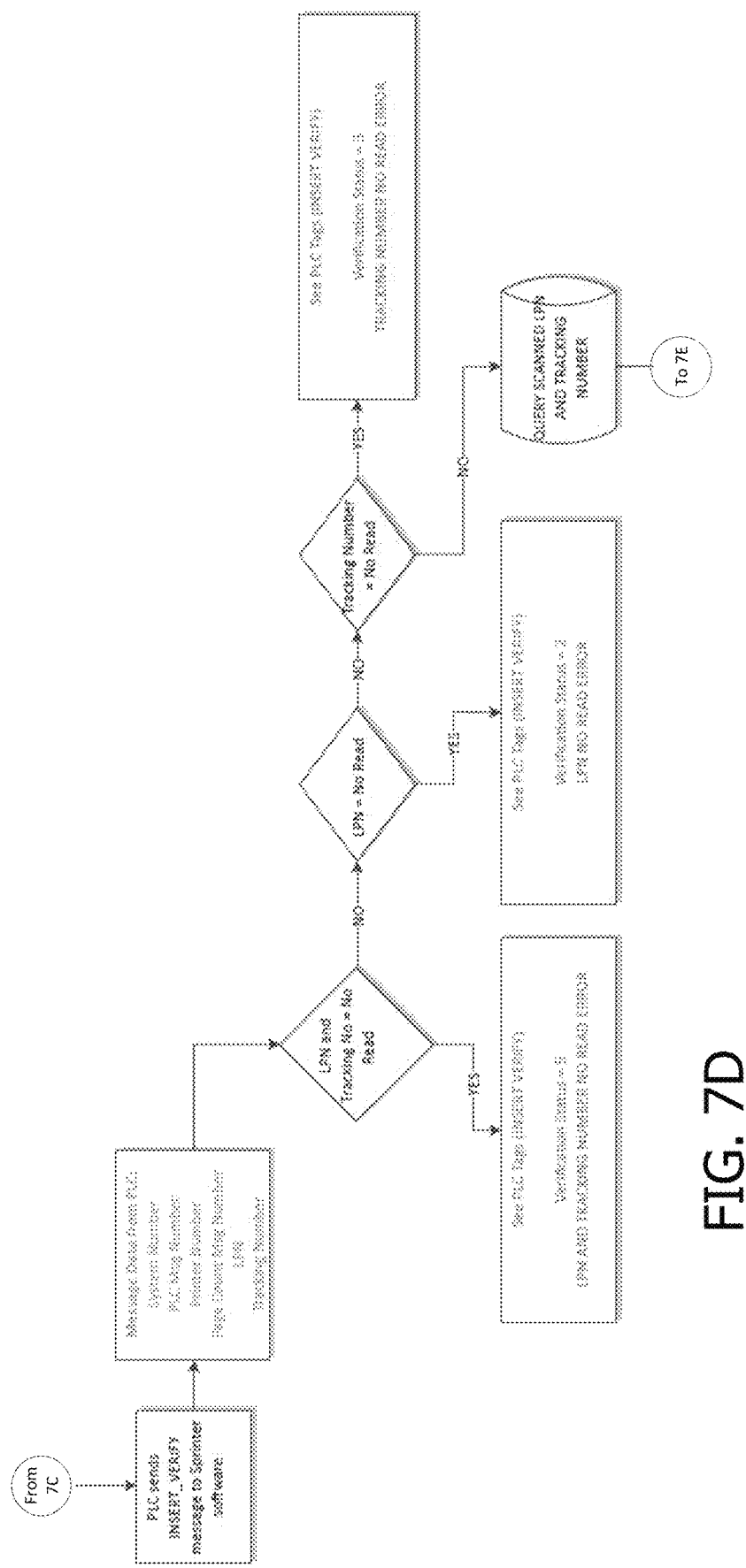
FIG. 7D is an exemplary process flow diagram depicting a fourth part of a printing and verification process according to an embodiment.

FIG. 7D continues once a successful printing is confirmed. The PLC sends an INSERT_VERIFY message to Sprinter software. The Message data from PLC provided is the system number, the PLC Msg Number, the Printer Number, the Page Count Msg Number, the LPN and the Tracking Number.

As used herein, the PLC Tags for the INSERT_VERIFY message comprises:

PC_INSERT_VERIFICATION(Printer Number)=
Verification Status+PLC Msg Number

PC_INSERT_VERIFY_MSG_NO(Printer Number)=
Must go to zero before process can continue.

A series of queries are initiated to determine whether both the LPN and the Tracking Number are unable to be read (if yes, an LPN AND TRACKING NUMBER NO READ ERROR is generated); whether the LPN alone cannot be read (LPN NO READ ERROR), or whether the tracking number alone cannot be read (TRACKING NUMBER NO READ ERROR). If the process passes these checkpoints, the scanned LPN and tracking number are queried in the database generated in the process in FIG. 6.

Figure 7E:
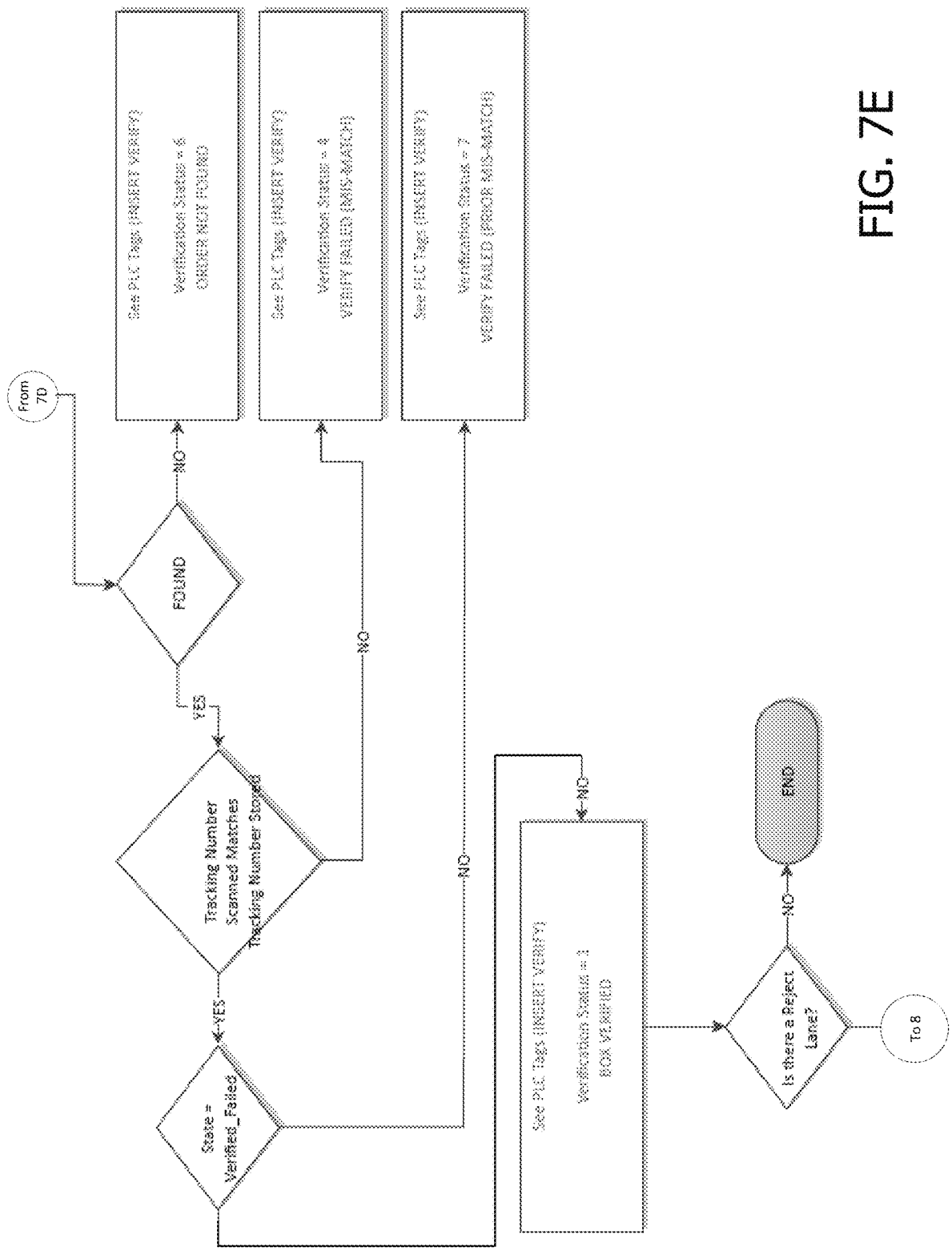
FIG. 7E is an exemplary process flow diagram depicting a fifth part of a printing and verification process according to an embodiment.

From FIG. 7D, if the scanned LPN and tracking number are not found, an error is generated (ORDER NOT FOUND) as shown in FIG. 7E. If they are found but the tracking number scanned does not match the tracking number stored, an error is generated (VERIFY FAILED (MIS-MATCH)). If the tracking number matches the tracking number stored but the State=Verified_Failed another error is generated (VERIFY FAILED (PRIOR MIS-MATCH). If no and there is no reject lane the process ends. If there is a reject lane, the process continues in FIG. 8.

Figure 8:
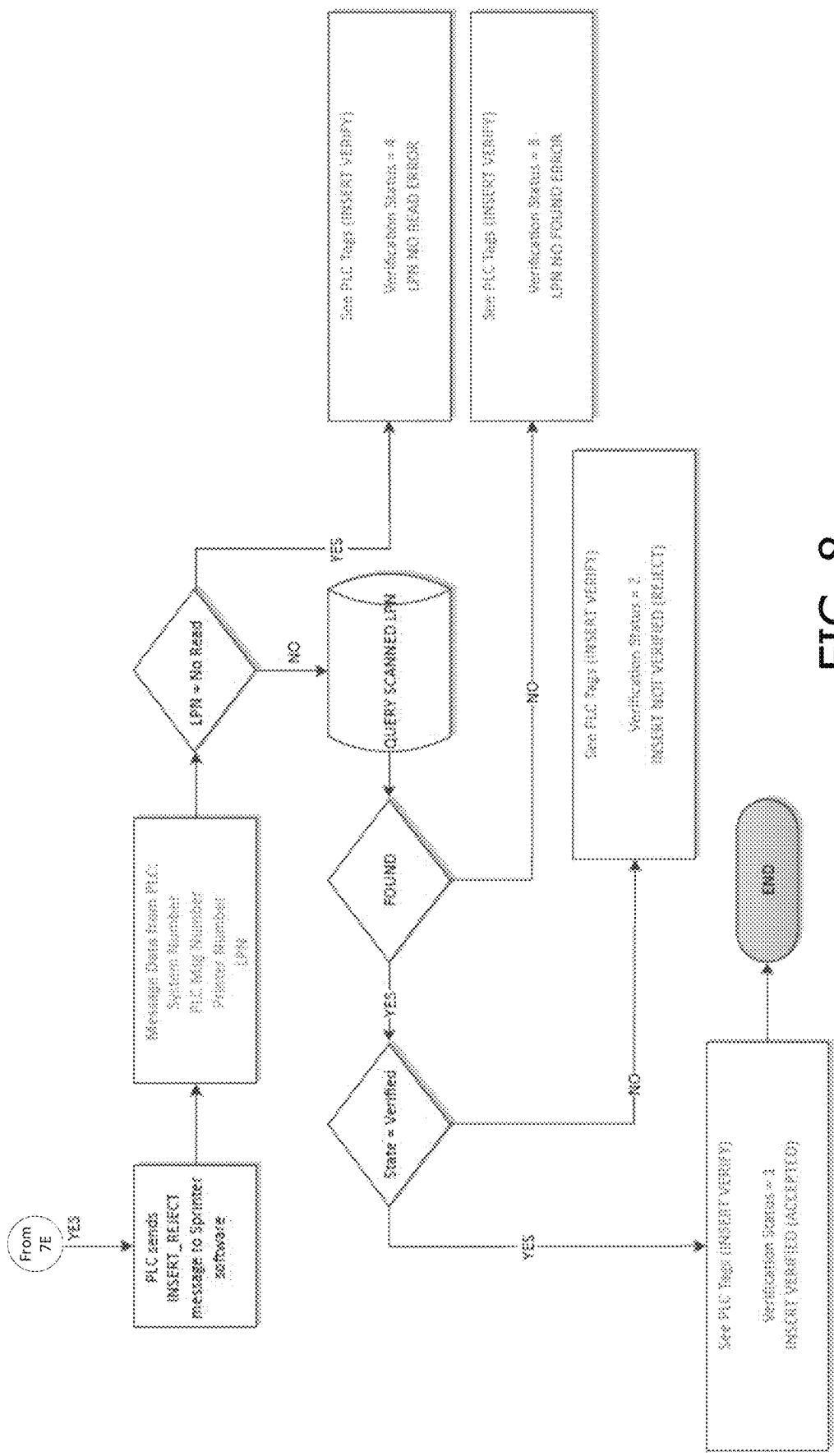
FIG. 8 is an exemplary process flow diagram indicating a carton divert process according to an embodiment.

FIG. 8 is an exemplary flow diagram diagramming the computer implemented method to identify and divert cartons having identifying indicia that does not match the corresponding identifying indicia stored on a database.

From FIG. 7E, PLC sends an INSERT_REJECT message to Sprinter software.

As used herein, an INSERT_REJECT message comprises:

PC_INSERT_REJECT(Printer Number)=Verification
status+PLC Msg Number.

The message data from the PLC include the system number, the PLC Msg Number, the Printer Number, and the LPN. If the LPN cannot be read, an LPN NO READ ERROR is generated. If it can be read, the scanned LPN is queried. If it not found, an LPN NO FOUND ERROR is generated. If it is found, but fails a "State=Verified" test, an INSERT NOT VERIFIED (REJECT) error is generated. If it is found and passes a "State=Verified" test, it is tagged with an INSERT VERIFIED (ACCEPTED) tag and the process ends.

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

In embodiments, a computer-readable storage device having processor-executable instructions stored thereon including instructions that, when executed by a staging processor, perform a method of: (a) queuing documents for printing on a printer located in a printing area, said printer configured to print one or more documents to be inserted into corresponding cartons on a conveyor, said printer capable of printing a first page in a first period of time and printing a second page after the first page in a second period of time, said first period of time being greater than the second period of time; (b) detecting a position of at least one of the cartons on the conveyor, said conveyor configured to carry a plurality of the cartons inbound to the printing area and outbound away from the printing area, said conveyor having an outbound capacity as a function of a number of the cartons carried thereon away from the printing area; (c) monitoring the outbound capacity of the conveyor based on the detected position of the at least one of the cartons; (d) releasing a group of the cartons inbound on the conveyor in response to the outbound capacity reaching a predetermined threshold; and (e) initiating printing the queued documents corresponding to the cartons in the group when the group of the cartons is released.

The computer-readable storage device can further comprise instructions that when executed by the processor, further perform querying a scanned LPN and a tracking number in a database to detect identifying indicia on the cartons. In embodiments, the instructions, when executed by the processor, can further perform (a) setting a verify tag if the scanned LPN matches the tracking number in the database and (b) setting a reject tag if the scanned LPN does not match the tracking number in the database.

In additional embodiments, the instructions, when executed by the processor, can further perform directing the cartons for which the verify tag is set onto the conveyor to carry the cartons away and diverting the cartons for which the reject tag is set.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for use with a conveyor configured to carry a plurality of cartons inbound to a printing area and outbound away from the printing area, said conveyor having an outbound capacity as a function of a number of the cartons carried thereon away from the printing area, said system comprising:
   a printer located in the printing area and configured to print one or more documents to be inserted into corresponding cartons on the conveyor, said printer capable of printing a first page in a first period of time and printing a second page after the first page in a second period of time, said first period of time being greater than the second period of time;
   a sensor for detecting a position of at least one of the cartons on the conveyor relative to the printer;
   a controller for cooperatively controlling operations of the conveyor and the printer based on the detected position of the at least one of the cartons relative to the printer, said controller including a staging processor for determining when to cause the conveyor to carry the cartons inbound past the printer and when to cause the printer to print the documents based on the detected position of the at least one of the cartons inbound to the printing area and the first period of time;
   a memory storing processor-executable instructions that, when executed by the staging processor, cause the controller to:
   queue the documents for printing;
   monitor an available outbound capacity of the conveyor based on the detected position of the at least one of the cartons outbound away from the printing area;
   release a group of the cartons inbound on the conveyor in response to the available outbound capacity reaching a predetermined threshold, the group comprising a number of the cartons based on the second period of time; and initiate printing the queued documents corresponding to the cartons in the group when the group of the cartons is released; and one or more carton scanners in communication with the controller and configured to detect identifying indicia on the cartons for use in verifying that the identifying indicia on each of the cartons matches parallel identifying indicia printed on the corresponding document inserted therein.

2. The system of claim 1, further comprising a folder associated with the printer, said folder folding the printed documents before inserting the folded documents into corresponding cartons on the conveyor.

3. The system of claim 1, wherein the group comprises at least three cartons before initiating printing.

4. The system of claim 1, wherein the controller is positioned locally to the printer.

5. The system of claim 1 wherein the controller is positioned remotely from the printer.

6. The system of claim 1, further comprising one or more carton scanners in communication with the controller and configured to detect identifying indicia on the cartons for use in verifying the identifying indicia match corresponding identifying indicia stored on a database.

7. The system of claim 6, wherein the conveyor comprises a primary lane for carrying outbound cartons and further comprising a gate responsive to the controller for diverting the outbound cartons for which the identifying indicia does not match the corresponding identifying indicia stored on the database away from the primary lane to an exception lane.

8. The system of claim 6, wherein the controller comprises an exception driver for comparing the identifying indicia to the corresponding identifying indicia stored on the database to determine which cartons have indicia that does not match the corresponding identifying indicia stored on the database and for generating a divert command in response thereto.

9. A computer implemented method for use with a conveyor configured to carry a plurality of cartons inbound to a printing area and outbound away from the printing area, said conveyor having an outbound capacity as a function of a number of the cartons carried thereon away from the printing area, said method comprising:

queuing documents for printing on a printer located in the printing area, said printer and configured to print one or more documents to be inserted into corresponding cartons on the conveyor, said printer capable of printing a first page in a first period of time and printing a second page after the first page in a second period of time, said first period of time being greater than the second period of time;

detecting a position of at least one of the cartons on the conveyor relative to the printer;

staging when to cause the conveyor to carry the cartons inbound past the printer and when to cause the printer to print the documents based on the detected position of the at least one of the cartons inbound to the printing area and the first period of time;

monitoring an available outbound capacity of the conveyor based on the detected position of the at least one of the cartons outbound away from the printing area;

releasing a group of the cartons inbound on the conveyor in response to the available outbound capacity reaching a predetermined threshold, the group comprising a number of the cartons based on the second period of time;

initiating printing the queued documents corresponding to the cartons in the group when the group of the cartons is released; and detecting identifying indicia on the cartons and verifying each of the cartons matches the corresponding document inserted therein based on the detected identifying indicia.

10. The computer implemented method of claim 9, wherein the identifying indicia includes a license plate number (LPN) and further comprising verifying that the identifying indicia on the cartons matches corresponding identifying indicia on a database by querying a scanned LPN and tracking number in a database.

11. The computer implemented method of claim 10, wherein verifying comprises setting a verify tag if the scanned LPN matches the tracking number in the database.

12. The computer implemented method of claim 11, further comprising directing the cartons for which the verify tag is set onto the conveyer to carry the cartons away.

13. The computer implemented method of claim 10, further comprising setting a reject tag if the scanned LPN does not match the tracking number in the database.

14. The computer implemented method of claim 13, further comprising activating a gate on the conveyor for diverting the cartons for which the reject tag is set.

15. A computer-readable storage device having processor-executable instructions stored thereon including instructions that, when executed by a staging processor, perform a method of:

queuing documents for printing on a printer located in a printing area, said printer configured to print one or more documents to be inserted into corresponding cartons on a conveyor, said printer capable of printing a first page in a first period of time and printing a second page after the first page in a second period of time, said first period of time being greater than the second period of time;

detecting a position of at least one of the cartons on the conveyor relative to the printer, said conveyor configured to carry a plurality of the cartons inbound to the printing area and outbound away from the printing area, said conveyor having an outbound capacity as a function of a number of the cartons carried thereon away from the printing area;

staging when to cause the conveyor to carry the cartons inbound past the printer and when to cause the printer to print the documents based on the detected position of the at least one of the cartons inbound to the printing area and the first period of time;

monitoring an available outbound capacity of the conveyor based on the detected position of the at least one of the cartons outbound away from the printing area;

releasing a group of the cartons inbound on the conveyor in response to the available outbound capacity reaching a predetermined threshold, the group comprising a number of the cartons based on the second period of time;

initiating printing the queued documents corresponding to the cartons in the group when the group of the cartons is released; and detecting identifying indicia on the cartons and verifying each of the cartons matches the corresponding document inserted therein based on the detected identifying indicia.

16. The computer-readable storage device of claim 15, wherein the identifying indicia includes a license plate number (LPN) and wherein the instructions, when executed by the processor, further perform querying a scanned LPN and a tracking number in a database to detect identifying indicia on the cartons.

17. The computer readable storage device of claim 16 wherein the instructions, when executed by the processor, further perform:
    setting a verify tag if the scanned LPN matches the tracking number in the database; and
    setting a reject tag if the scanned LPN does not match the tracking number in the database.

18. The computer readable storage device of claim 17 wherein the instructions, when executed by the processor, further perform:
    directing the cartons for which the verify tag is set onto the conveyer to carry the cartons away; and
    diverting the cartons for which the reject tag is set.

* * * * *